United States Patent [19]

Fiala

[11] 4,400,997

[45] Aug. 30, 1983

[54] DRIVE FOR A VEHICLE WITH AN INTERNAL COMBUSTION ENGINE AND AN ELECTRIC MOTOR

[75] Inventor: Ernst Fiala, Wolfsburg, Fed. Rep. of Germany

[73] Assignee: Volkswagenwerk Aktiengesellschaft, Fed. Rep. of Germany

[21] Appl. No.: 199,999

[22] Filed: Oct. 23, 1980

[30] Foreign Application Priority Data

Oct. 27, 1979 [DE] Fed. Rep. of Germany ....... 2943519

[51] Int. Cl.³ .............................................. F16H 37/06
[52] U.S. Cl. ..................................... 74/661; 192/3.58; 192/0.098; 200/61.88; 290/45; 180/65 A
[58] Field of Search ................. 74/661, 877, 878, 866; 192/3.56, 3.58, 3.62, 0.098, 48.6; 200/61.88, 61.91; 290/45; 180/65 A; 60/718

[56] References Cited

U.S. PATENT DOCUMENTS

| | | | |
|---|---|---|---|
| 3,650,345 | 3/1972 | Yardney | 180/65 A |
| 3,861,484 | 1/1975 | Joslin | 180/65 A |
| 4,099,589 | 7/1978 | Williams | 290/45 X |
| 4,165,795 | 8/1979 | Lynch et al. | 180/65 A |
| 4,183,424 | 1/1980 | Rumyantsev | 200/61.88 X |
| 4,305,254 | 12/1981 | Kawakatsu et al. | 290/45 X |

FOREIGN PATENT DOCUMENTS

| | | |
|---|---|---|
| 2133485 | 7/1971 | Fed. Rep. of Germany . |
| 222098 | 4/1939 | Switzerland . |
| 393311 | 5/1933 | United Kingdom . |

Primary Examiner—Leslie A. Braun
Assistant Examiner—Frank H. McKenzie, Jr.
Attorney, Agent, or Firm—Brumbaugh, Graves, Donohue & Raymond

[57] ABSTRACT

A drive for a vehicle with an internal combustion engine and an electric motor drivingly connected to a manual transmission with a clutch is provided. The transmission has a shift lever, a shift gate, a lane associated with the lowest gear of the transmission, and an input shaft. A control lever is longitudinally displaceable when the shift lever is in a neutral position, and is supported by the shift lever when the shift lever is in the neutral position. The shift gate supports the control lever when the shift lever is positioned out of the neutral position. A first switch is positioned in the transmission and is actuated by the control lever. A spring normally biases the control lever into contact with the first switch. A first motor circuit includes an accelerator pedal coupled to a regulator to control the speed of the electric motor. A second motor circuit includes the accelerator pedal coupled to a power regulator to control the speed of the internal combustion engine. First and second clutch circuits disengage the clutch, with the second clutch circuit having a switch to disengage the clutch when the driver touches the shift lever. The first switch selects the first clutch circuit in the first motor circuit when the control lever is longitudinally displaced, and selects the second motor circuit and the second clutch circuit when the control lever is not longitudinally displaced.

15 Claims, 4 Drawing Figures

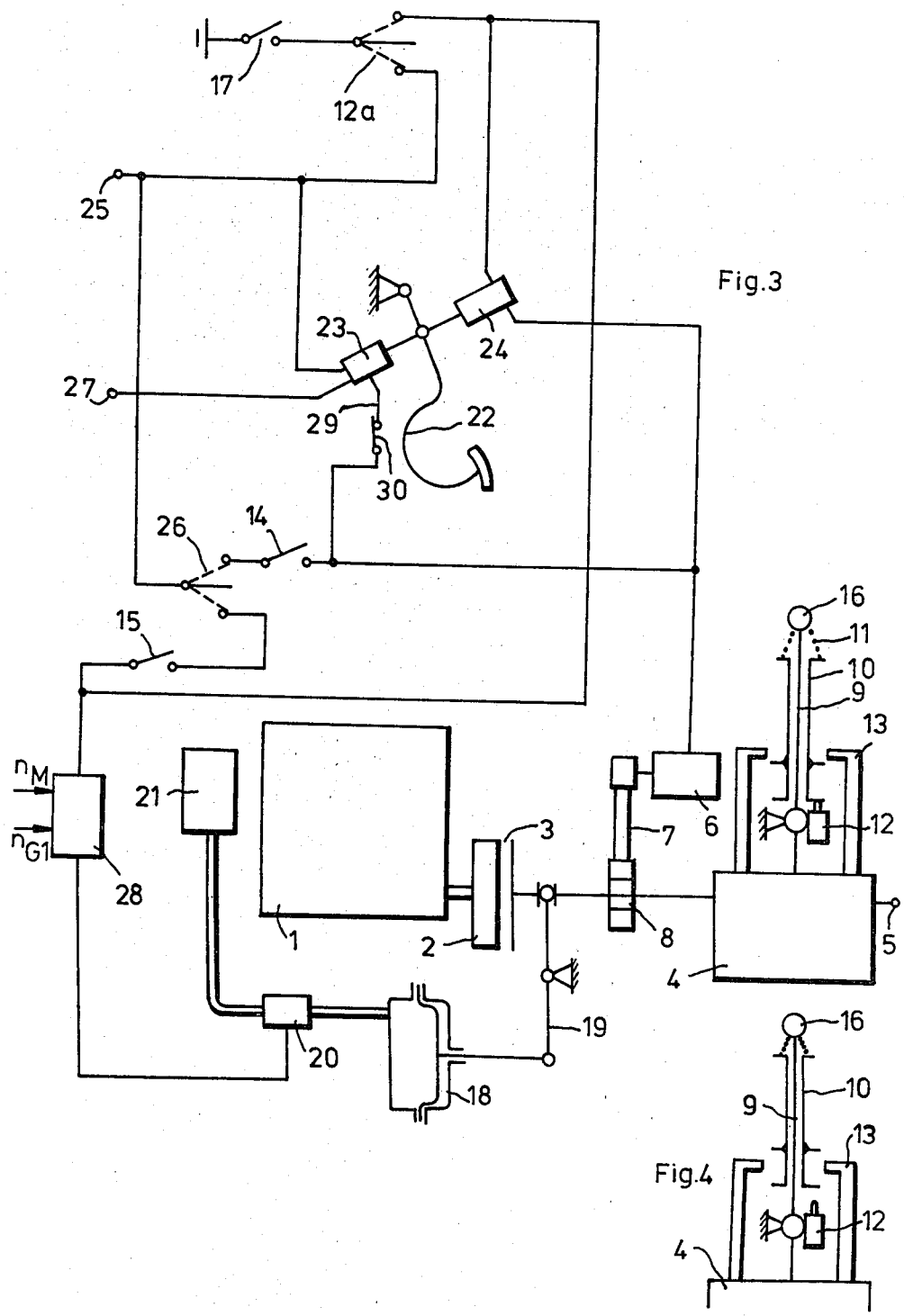

DRIVE FOR A VEHICLE WITH AN INTERNAL COMBUSTION ENGINE AND AN ELECTRIC MOTOR

BACKGROUND OF THE INVENTION

This invention relates to drives for vehicles, and more particularly, to a drive which offers the driver a choice between drive by an elecric motor and drive by an internal combustion engine.

The recent decrease in supplies of petroleum has brought about a consequent increase in the price of refined products, such as gasoline and diesel fuel. The increases in prices of fuel have brought about a demand for more efficient engines and motor vehicles which conserve the use of fuel.

It is recognized that the internal combustion engine commonly found in motor vehicles today is inefficient at low speeds. Electric motors, on the other hand, are comparatively more efficient at lower speeds, but not at higher speeds. Thus, it has been proposed that a vehicle utilize an electric motor for low speeds and an internal combustion engine for higher speeds. Such a drive is known in its broadest sense from the British Pat. No. 393,311 as well as a similar design in German letters of disclosure No. 21 33 485 classified in B60L, 13/00. In a vehicle with a dual drive, the electric motor can be used in speed and rotational ranges within which the efficiency of the internal combustion engine is relatively low.

Additionally, a starter motor for the internal combustion engine may be eliminated in a dual drive vehicle since the electric motor can also perform this function.

Swiss Pat. No. 222,098 discloses a drive with an internal combustion engine and an electric motor which also serves as a starter motor. The driver actuates a single lever to start the vehicle, and when a predetermined speed is reached, the internal combustion engine is switched in and the electric motor is cut out.

SUMMARY OF THE INVENTION

In accordance with the present invention, a drive for a motor vehicle is provided which offers the driver a choice between drive by electric motor and drive by an internal combustion engine. The driver may, however, permit the drive automatically to select the optimal manner of operation, in which case the driver need actuate only a single accelerator pedal in the usual manner.

In accordance with an aspect of the present invention, an apparatus for controlling the operation of the drive train of a vehicle is provided. The vehicle has a drive train including an internal combustion engine, a clutch, a manual transmission and an electric motor connected to the transmission. The transmission has a shift lever, a shift gate, a shift lane associated with the lowest gear of the transmission, and an input shaft. A control lever is supported by the shift lever and is longitudinally displaceable against a spring when the shift lever is in the neutral position. The shift gate supports the control lever when the shift lever is in the displaced position. A first switch is provided in the transmission and is actuated by the control lever. A first motor circuit includes means coupled to the accelerator pedal for controlling the speed of the electric motor. A second motor circuit includes means coupled to the accelerator pedal for controlling the speed of the engine. First and second clutch circuits for disengaging the clutch are provided, with the second clutch circuit including a second switch for engaging the clutch when the shift lever is grasped by the driver. The first switch selects the first clutch circuit and the first motor circuit when the control lever is longitudinally displaced, and selects the second motor circuit and the second clutch circuit when the control lever is not longitudinally displaced.

In accordance with a further aspect of the present invention, a single electric circuit may be used for starting the internal combustion engine as well as for driving the vehicle in case of "secondary" driving purposes, e.g., driving in garages, pedestrian malls, inner city traffic or in traffic congestion. Moreover, the electric motor can be used for driving in reverse, with an overrun device operating as a clutch. In an emergency, such as when the internal combustion engine is damaged or out of fuel, the vehicle can be operated with the electric motor, at least over a short distance, with the battery of the motor being recharged from the lighting circuit.

BRIEF DESCRIPTION OF THE DRAWINGS

The foregoing and other features of the present invention will be described in greater detail in connection with the drawings wherein:

FIG. 3 illustrates a drive with shifting and regulating devices; and

FIG. 4 is a detailed view of the shift lever of the transmission.

DETAILED DESCRIPTION

Figure 1:
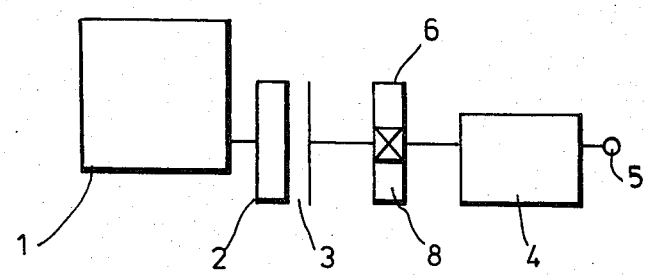
FIGS. 1 and 2 are diagrammatic views of one embodiment of a drive according to the present invention, with different couplings of the electric motor.

FIG. 1 shows diagrammatically an internal combustion engine 1 with a flywheel 2, a clutch 3, a transmission 4, an output to a vehicle 5 and an electric motor 6 arranged between the clutch 3 and the transmission 4.

Figure 2:
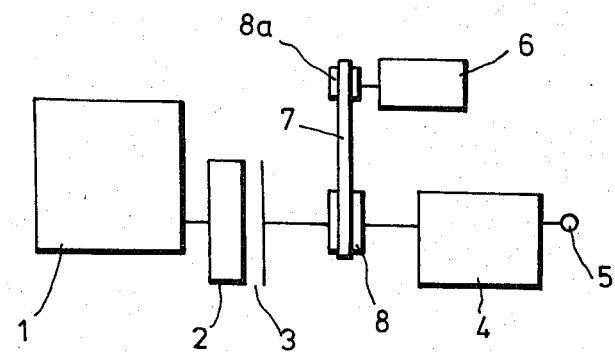

In FIG. 2 the electric motor 6 acts through a suitable power transmission, such as a gear, chain, belt, etc. An overrun 8 (FIG. 2:8a) is attached to the output of the electric motor 6 and synchronizes the transmission 4 from the moment of inertia of the electric motor 6.

A vehicle equipped in accord with the present invention may be operated as follows:

1. Conventional:

With the transmission 4 in the neutral position and the clutch 3 engaged, the electric motor 6 starts the internal combustion engine 1.

2. Electric Operation:

After the engine 1 is started, the clutch 3 is disengaged by any suitable means, such as by depressing a clutch pedal. Depending on the desired speed or direction of drive in electric operation, a suitable gear is engaged in the transmission 4. The speed can be selected by means of the accelerator pedal.

3. Mixed Operation:

(a) Starting: With the clutch 3 disengaged and the gear engaged, the vehicle is placed into motion with the electric motor 3 and accelerates to about 15 km/h. Thereafter, the transmission 4 is shifted to its neutral position and the clutch 3 is closed. Now the internal combustion engine 1 can be started via the clutch 3 by the electric motor 6. Thereafter, the clutch is disengaged, the gear is engaged and the clutch 3 engaged. Further travel occurs in a conventional manner.

(b) Driving with approximately constant speed: Relatively slow speeds can be driven most efficiently with electric motor 6 since the efficiency of an internal combustion engine at small outputs is relatively low. In order to operate electrically, the clutch 3 is disengaged, the internal combustion engine 1 is eventually stopped and, with the gear engaged, driving occurs electrically. Restarting of the internal combustion engine 1 may be obtained as described under (a) or simply by closing the clutch 3.

Referring to FIG. 3, the shift tube 10 is arranged as a longitudinally displaceable lever around the shift lever 9. In FIG. 3, the control tube 10 is normally biased against the switch 12 by means of the spring 11. Only when the shift lever 9 is in the neutral lane of the shift gate 13 can the control lever 10 be pulled upward by the driver into the position shown in FIG. 4. When a gear has been engaged, the shift gate 13 supports the control lever 10 in the pertinent position. The switch 12 has a change-over contact 12a.

Furthermore, the shift lever 9 actuates the contact 14 in such a manner that it is closed when the shift lever 9 is in the shift gate lane associated with the first and second gears. However, if the shift lever is positioned in the lane for the third and fourth gears into which the shift lever 9 is conventionally pulled by spring force, the contact is open. Finally, the touch contact 15 closes if a force is exerted on the shift lever knob 16. The contact 17 of the ignition lock connects the entire circuit.

The clutch 3 is actuated by the servo motor 18 via the pivoting lever 19. In the illustrated embodiment, the servo motor 18 contains a negative pressure cylinder which is driven from the storage tank 21 via the magnetic valve 20. The clutch 3 is disengaged when the magnetic valve 20 receives current.

The accelerator pedal 22 actuates through the power regulator 23 the throttle valve or the injection pump of the internal combustion engine. Accelerator pedal 22 actuates through motor regulator 24 the electric motor 6.

The vehicle is operated as follows:

The shift lever 9 is placed in its neutral position in the lane for the third and fourth gears. The ignition lock contact 17 is closed, and puts the system under voltage. Contact 12a is in the lower position, as in FIG. 3, so that the control lever 10 bears on the switch 12. The contacts 14 and 15 are open so that nothing happens. The ignition is activated through fuel supply 25.

If the driver starts the vehicle in a conventional fashion, shift lever 9 is moved into the lane for the first and second gears, and contact 14 is closed. The selector switch 26 depends upon the rotational speed $n_M$ of the internal combustion engine. If $n_M$ is larger than the idling speed $n_{M1}$, it will have moved down, as in FIG. 3. Otherwise, it is in the upper position. Thus, the electric motor 6 receives current via the contact 14 and starts the internal combustion engine 1 via the clutch 3. The engine 1 having started, contact 26 is moved to the lower position. The electric motor 6 is without current, and the electromagnetic valve 20 over the closed touch contact 15 receives current since the shift lever knob 16 has been gripped. Therefore, the clutch 3 is disengaged and the first gear is engaged. The power regulator 23, responsive to the position of the accelerator pedal 22, controls the output of the internal combustion engine 1 through adjustment signals at terminal 27.

Regulator 28 receives signals for the rotational speed $n_M$ of the engine 1 and the rotational speed $n_{G1}$ of the transmission input shaft. When the knob 16 is released, and touch contact 15 opens, clutch 3 closes, and regulator 28 permits rapid and complete engagement, only if $n_M > n_{M1}$ (i.e., engine rotational speed provides sufficient torque) and $n_M \approx n_{G1}$. The vehicle will accelerate in response to the position of the accelerator pedal 22. Regulator output 29 of the power regulator 23 provides additional torque to the electric motor 6 to facilitate starting. As a result, the first gear of the transmission 4 may be relatively long, thereby minimizing engine speed and fuel consumption.

In the reverse gear, the contact 30 suspends the operation of the electric motor 6.

On shifting from first to second gear, the touch contact 15 closes when the driver grips the shift lever knob 16, and the clutch 3 opens. The gears can now be changed. Clutch 3 closes rapidly if $n_M = n_{G1}$.

In an other embodiment, the power regulator 23 regulates the throttle valve or the like in an engine speed-dependent range which provides favorable fuel consumption. This causes the driver to shift to a higher gear since, otherwise, the speed will increase beyond the desired rate. It is only in the highest gear that all operating points of the internal combustion engine can be selected. The driver may be advised by a suitable signal that he is driving in an unfavorable operating range and should shift to a higher gear, should driving conditions permit.

When the driver wishes to drive using the electric motor 6, he can pull the control lever 10 upwards following connection of the ignition switch (contact 17). The contact 12a is then in the upper position. The electro-magnetic valve 20 is under voltage, i.e., the clutch 3 is disengaged. The operator has all gears available for electric operation. When he engages a gear, the shift gate 13 holds the control lever 10 and thereby contact 12a in the upper position.

The operator regulates the output of the electric motor 6 by means of the accelerator pedal 22 and the motor regulator 24.

The vehicle, having started electrically, can be switched to operation by the internal combustion engine 1 by disengaging the first gear, and moving control lever 10 into the lower position. Accordingly, the engine 1 will start as described above. The operator again engages the first gear (control lever 10, however, remains in the lower position) and continues acceleration with engine 1.

If, on the other hand, driving is to continue electrically following acceleration by means of the internal combustion engine 1, the operator disengages the gear and pulls control lever 10 upward so that the contact 12a moves to the upper position. The internal combustion engine stops when the fuel supply at 25 stops, and the clutch 3 is disengaged. When the control lever 10 has been pulled upward, the operator can shift into any desired gear. As long as he does not actuate the accelerator pedal 22, the electric motor 6 remains without current, and due to the overrun 8, at rest. By depressing the accelerator pedal, the operator can switch to the electric drive (e.g., in case of low speeds when driving in convoy, city driving, etc).

There are two ways to return to the operation of the internal combustion engine 1. If the shift lever knob 16 is in neutral position and the control lever 10 in its lower position, the shift lever 9 can be moved into the lane for the first and second gears, and the engine is started with the electric motor, as described hereinbefore. However, after lowering the control lever 10 (i.e., contact 12a is in the lower position), the third or fourth gear can be engaged. When the knob 16 is released, the clutch 3 closes and the internal combustion engine 1 is started by the vehicle.

In case the overrun 8 is replaced with a controllable clutch, the electric motor 6 may be used as a generator and also in (or as) the reverse gear. The controllable clutch 8 opens on shifting (parallel to the touch contact 15) and also when the rotational speed is too great.

All of the aforegoing operating possibilities may be attained with the following circuits which as regards the circuit wiring are largely identical:

A first motor circuit extends over the contact 12a and the motor regulator 24.

A second motor circuit extends likewise over the contact 12a as well as the rotational speed-dependent contact 26 and the contact 14.

A third motor circuit, serving as a starter circuit, extends over the contact 12a and a start regulator. In the illustrated embodiment, the starter or regulator is combined with the power regulator 23 but with a separate regulator output 29, as well as over the contact 30.

A first clutch circuit extends over the contact 12a directly via the regulator 28 and the electromagnetic valve 20.

A second clutch circuit extends over the contact 12a, the speed-dependent contact 26 as well as the touch contact 15.

Finally, there is an output-regulating circuit which extends over the contact 12a and the power regulator 23.

Details of the touch contact 15 may be found in German patent application No. 12 11 078 or German Pat. No. 11 64 843, 63c, 20/01.

While more than one embodiment of the present invention has been described in detail herein and shown in the accompanying drawings, it will be evident that various further modifications are possible without the departing from the spirit and scope of the invention.

What is claimed is:

1. In a vehicle having a drive train including an accelerator lever and an internal combustion engine, a clutch, a manual transmission and an electric motor connected to said transmission, said transmission having a shift lever, a shift gate, a shift lane associated with the lowest gear of said transmission, and a transmission input shaft, apparatus for controlling operation of said drive train, comprising:

a control lever supported by said shift lever and longitudinally displaceable against a spring when said shift lever is in a neutral position, said control lever having means for retaining said control lever in the displaced position by engaging said shift gate when said shift lever is positioned out of said neutral position;

a first switch in said transmission actuated by said control lever;

a first motor circuit including means coupled to said accelerator lever for controlling the speed of said electric motor; a second motor circuit including means coupled to said accelerator lever for controlling the speed of said engine;

a first clutch circuit for disengaging said clutch;

a second clutch circuit including a second switch for disengaging said clutch when said shift lever is grasped;

said first switch selecting said first clutch circuit and said first motor circuit when said control lever is longitudinally displaced, and selecting said second motor circuit and said second clutch circuit when said control lever is not longitudinally displaced.

2. Apparatus as specified in claim 1, wherein said second clutch circuit includes:

means generating an engine speed signal proportional to the rotational speed of said engine;

means generating an idling speed signal proportional to the nominal idling speed of said engine;

third switch means actuated by said shift lever when said shift lever is positioned in said shift lane associated with the lowest gear of said transmission; and a speed-dependent switch for selecting said second clutch circuit when said engine speed signal is greater than said idling speed signal, and for selecting said second motor circuit energized by said third switch when said shift lever is in said shift lane associated with the lowest gear of said transmission.

3. The drive in claim 1, wherein said first and second clutch circuits include:

means generating an engine speed signal proportional to the rotational speed of said engine;

means generating a transmission speed signal proportional to the rotational speed of said input shaft of said transmission; and regulator means actuated by said second switch for retarding the current drop in said clutch circuit resulting from opening of said second switch when said engine speed signal is below a predetermined value, and when said engine speed signal significantly differs from said transmission speed signal.

4. The drive in claim 3, wherein said second clutch circuit includes:

means generating an idling speed signal proportional to the nominal idling speed of said engine;

contact means in said second motor circuit actuated by said shift lever when said shift lever is in said shift lane associated with the lowest gear of said transmission; and a speed dependent switch for selecting said second clutch circuit when said engine speed signal is greater than said idling speed signal, and for selecting said second motor circuit energized when said shift lever actuates said contact means.

5. The drive in claim 1, 2, 3, or 4 and further comprising a third motor circuit, including:

a power regulator for regulating the speed of said engine;

said accelerator lever coupled to said power regulator;

said electric motor;

wherein said third motor circuit is energized by said first switch to start said engine with said electric motor.

6. The device in claim 5, wherein said third motor circuit includes a contact opening when the reverse gear of said transmission is engaged.

7. The drive in claim 1, 2, 3, or 4 and further comprising a second clutch drivingly connected to said electric motor for disengaging said electric motor when said clutch is disengaged, when the rotational speed of said engine exceeds a first predetermined value, or when the rotational speed of said electric motor exceeds a second predetermined value.

8. The drive in claim 5 and further comprising a second clutch drivingly connected to said electric motor for disengaging said electric motor when said clutch is disengaged, when the rotational speed of said engine exceeds a first predetermined value, or when the rotational speed of said electric motor exceeds a second predetermined value.

9. The drive in claim 6 and further comprising a second clutch drivingly connected to said electric motor for disengaging said electric motor when said clutch is disengaged, when the rotational speed of said engine exceeds a first predetermined value, or when the rotational speed of said electric motor exceeds a second predetermined value.

10. The drive in claim 1, 2, 3 or 4, wherein said control lever is a tube surrounding said shift lever.

11. The drive in claim 5 wherein said control lever is a tube surrounding said shift lever.

12. The drive in claim 6 wherein said control lever is a tube surrounding said shift lever.

13. The drive in claim 7 wherein said control lever is a tube surrounding said shift lever.

14. The drive in claim 8 wherein said control lever is a tube surrounding said shift lever.

15. The drive in claim 9 wherein said control lever is a tube surrounding said shift lever.

* * * * *